Oct. 2, 1934.　　　O. H. HANSEN　　　1,975,574
CORN CUTTER
Filed April 18, 1931　　8 Sheets-Sheet 1

Oct. 2, 1934.   O. H. HANSEN   1,975,574
CORN CUTTER
Filed April 18, 1931   8 Sheets-Sheet 2

INVENTOR
O. H. Hansen
BY
Morsell & Morsell
ATTORNEYS.

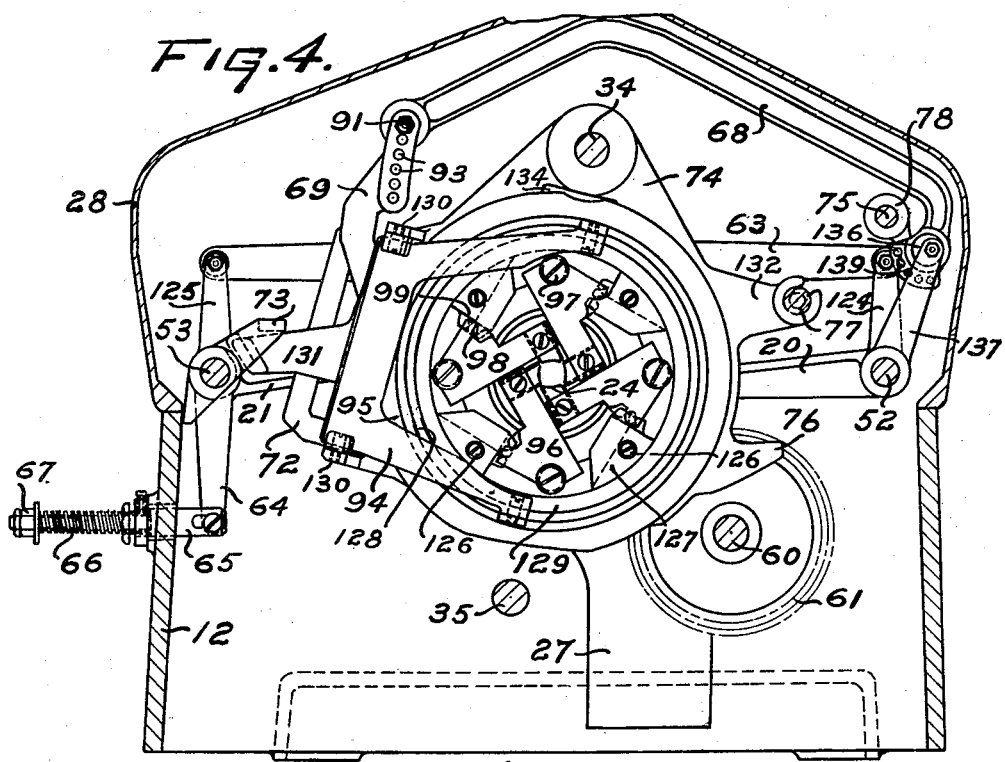
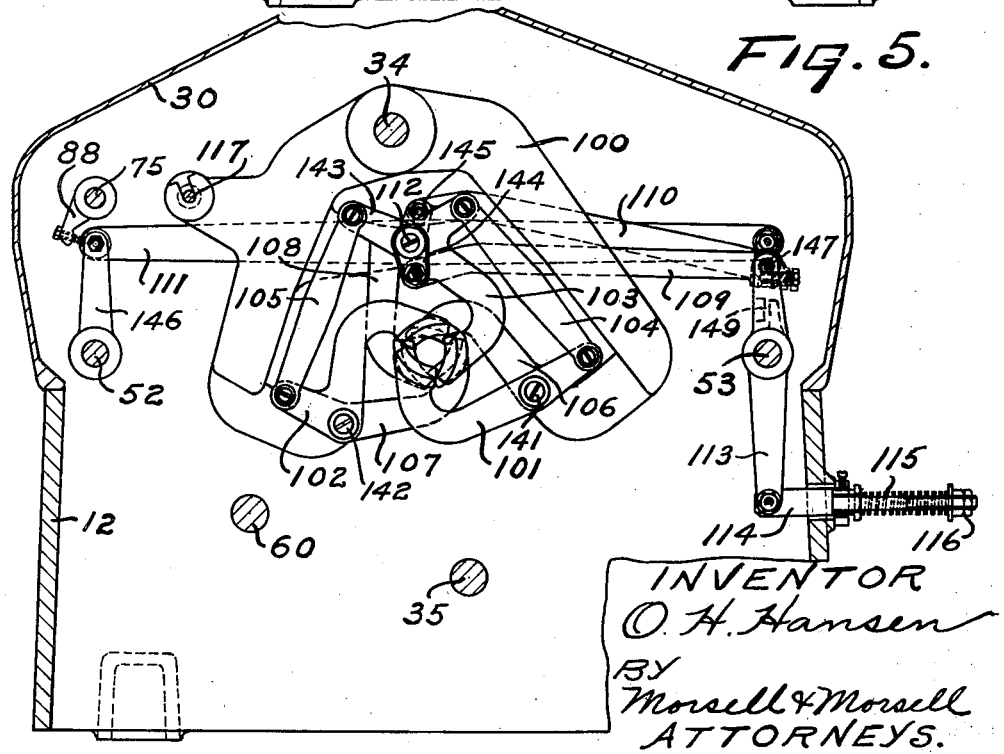

Oct. 2, 1934.  O. H. HANSEN  1,975,574
CORN CUTTER
Filed April 18, 1931  8 Sheets-Sheet 4
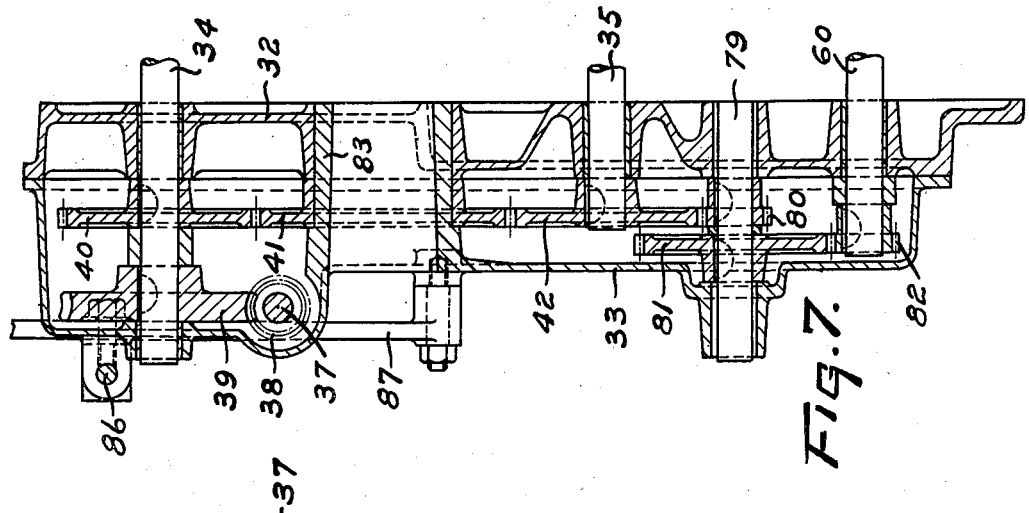
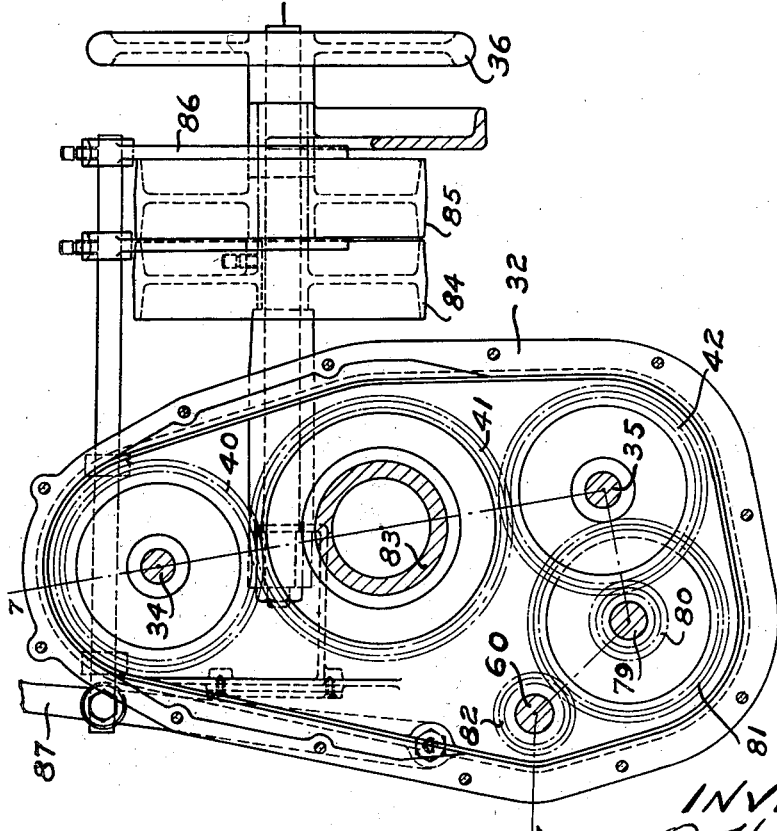
INVENTOR
O. H. Hansen
BY
Morsell & Morsell
ATTORNEYS.

Oct. 2, 1934.   O. H. HANSEN   1,975,574
CORN CUTTER
Filed April 18, 1931    8 Sheets-Sheet 5
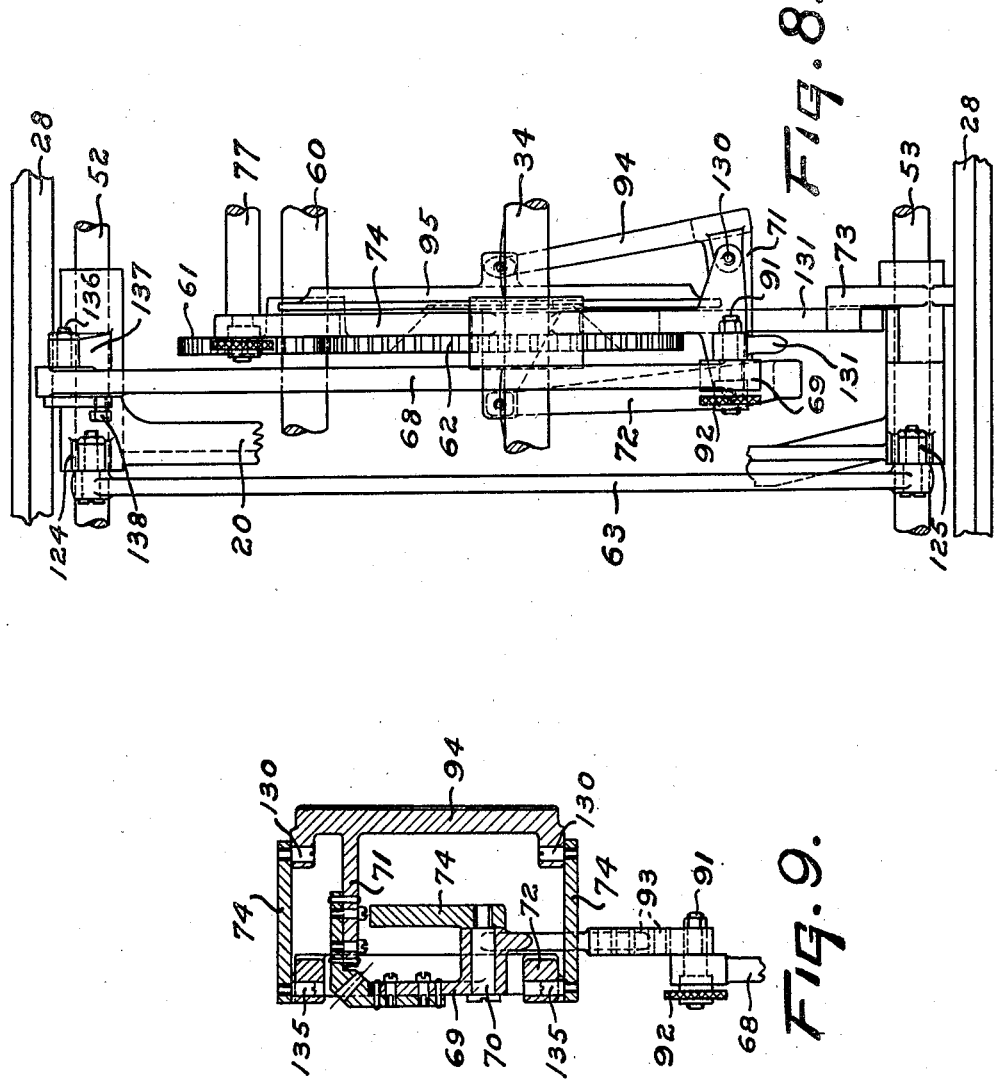
INVENTOR
O. H. Hansen
BY
Morsell & Morsell
ATTORNEYS.

Oct. 2, 1934.  O. H. HANSEN  1,975,574
CORN CUTTER
Filed April 18, 1931   8 Sheets-Sheet 6
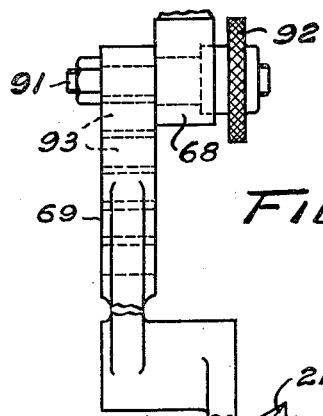
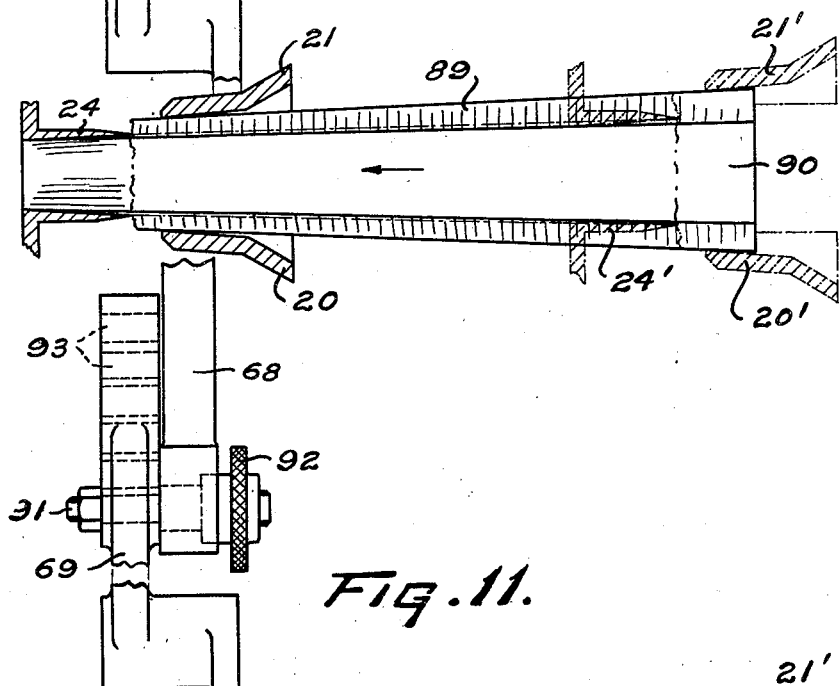
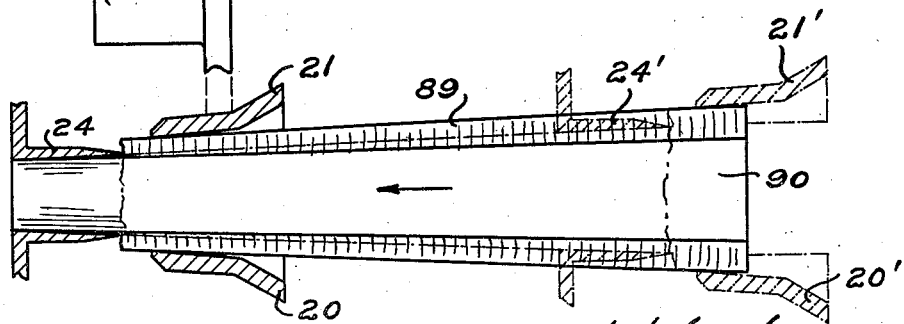
INVENTOR
O. H. Hansen
BY
Morsell & Morsell
ATTORNEYS

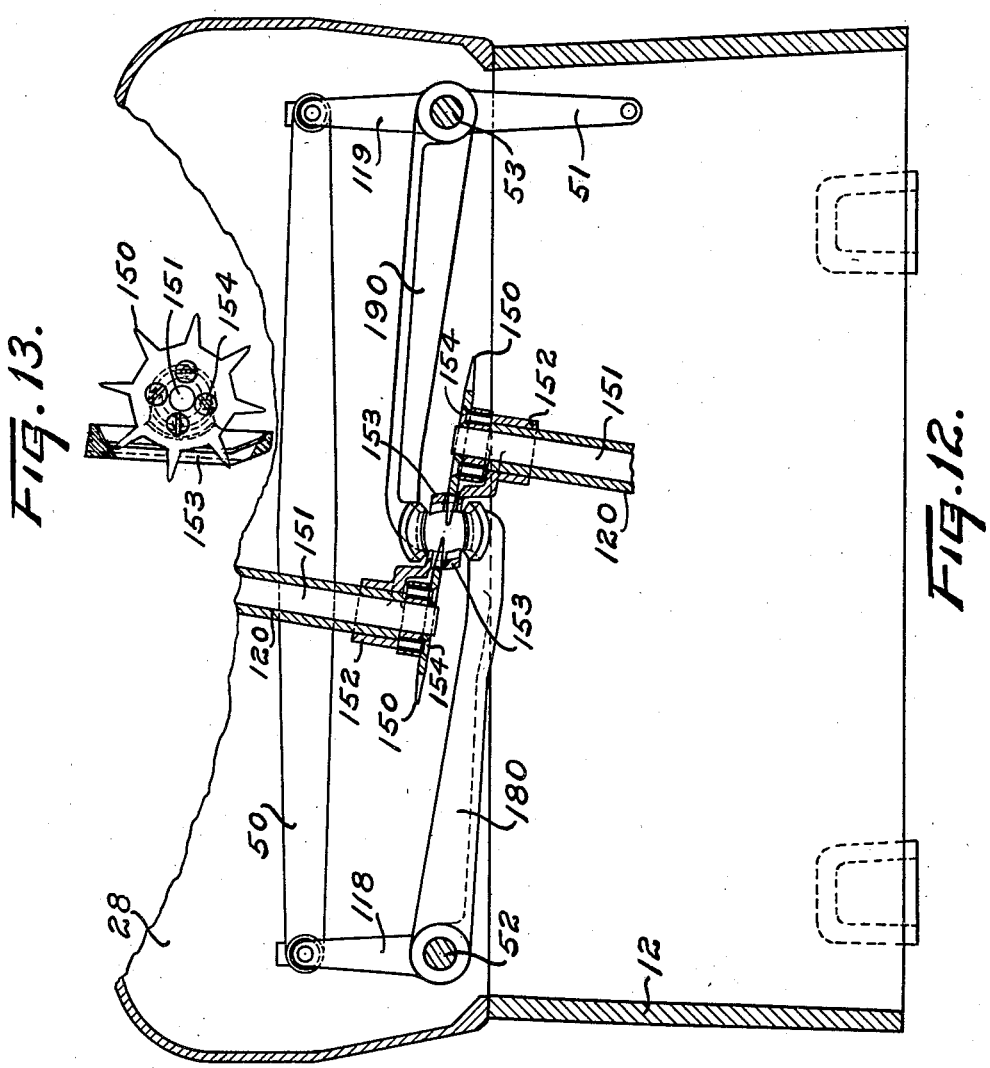

Oct. 2, 1934.  O. H. HANSEN  1,975,574
CORN CUTTER
Filed April 18, 1931   8 Sheets-Sheet 8
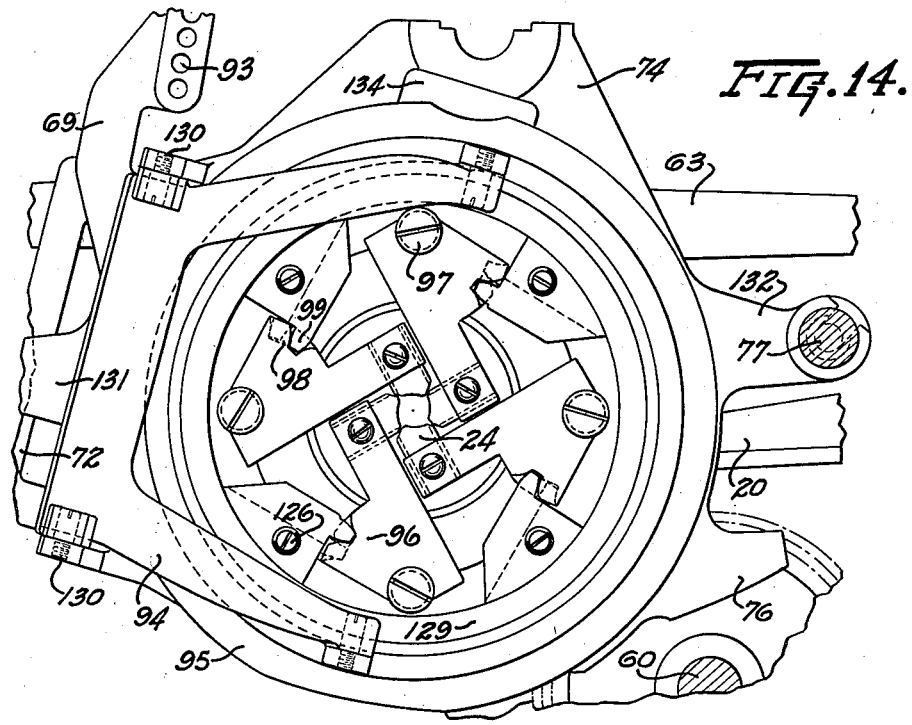
FIG. 14.
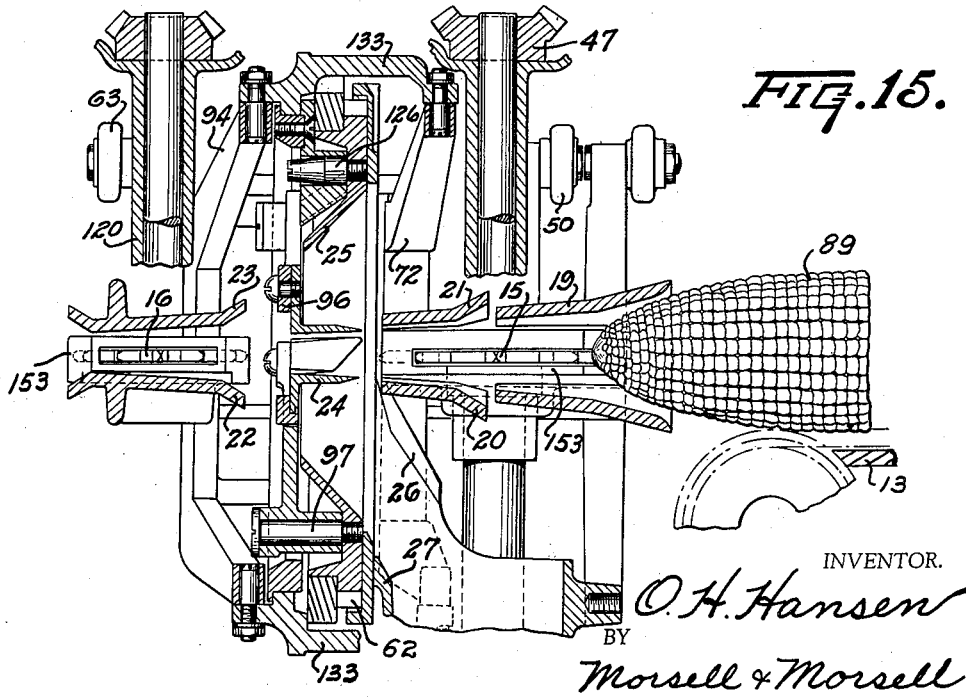
FIG. 15.
INVENTOR.
BY Morsell & Morsell
ATTORNEYS.

Patented Oct. 2, 1934

1,975,574

UNITED STATES PATENT OFFICE 1,975,574

CORN CUTTER

Oswald H. Hansen, Cedarburg, Wis.

Application April 18, 1931, Serial No. 531,153

17 Claims. (Cl. 130—9)

The present invention relates in general to improvements in the art of removing juice laden corn from cobs, and relates more specifically to improvements in the construction and operation of corn cutters for shearing the kernels from their supporting cobs preparatory to utilization or subsequent packing of the removed kernels in receptacles such as cans or jars.

A general object of the invention is to provide an improved method of removing corn from the cob, and also to provide simple and efficient mechanism for effecting commercial exploitation of the method and for automatically effecting removal of desirable portions of corn kernels from cobs.

It has for many years been customary in the canning industry to cut juice laden or green corn from cobs, and to subsequently pack the removed corn in suitable containers. In some instances it is desirable to cut away only a portion of the kernels and to subsequently scrape the remaining portion of the kernels from the supporting cobs, this product being known commercially as "cream corn"; whereas in other instances it is desirable to cut practically the entire kernels from the supporting cobs, this product being known to the trade as "whole corn". Both of these products have been well known for many years, and numerous machines have been contrived in an effort to effectively produce the products.

In the case of machines adapted to produce either or both of these well known products, it is extremely desirable to provide the following characteristics:—

1. Adjustability of the cutters to cooperate effectively and in any desired manner with varying sizes and forms of cobs, and species of corn.

2. Sanitary construction whereby materials and juices are prevented from accumulating upon the machine and the mechanism is readily accessible for cleaning.

3. All parts of the machine protected against damage and readily accessible for inspection, removal and renewal of parts.

4. Ease of operation, that is, adjustability of the various structures either during normal operation of the machine, or while at rest.

5. Safety in operation by having dangerous moving parts properly enclosed, without hindering freedom of access.

6. Efficiency in operation by applying the power with minimum loss, and by providing effective supports for the moving parts and especially for the rotary elements, and by further providing for abundant lubrication without danger of having the lubricant reach the product.

7. Protection of the movable parts against exposure to acidy and sticky juices in order to prevent corrosion thereof and resistance by the gummed juices to free operation of the parts.

8. Constructed to permit effective cutting of both long and short cobs, or fragments of cobs, as well as large or small kernels and any desired portions thereof.

9. Simply constructed without sacrificing durability; and

10. Built and operable to produce maximum capacity with minimum expenditure of power.

In the case of whole corn cutters, it is additionally desirable to have the machines adapted:—

11. To remove the kernels without undesirable mutilation thereof; and

12. To remove all of the wholesome corn without cutting into the cobs and thus removing portions of the cobs with the kernels.

The prior machines of this general type were not adapted to produce the foregoing desirable results, and it is a more specific object of the present invention to provide a machine which will unquestionably and effectively produce all of these results.

Other more specific objects of the present invention may be enumerated as follows:

To provide a corn cutter which is adapted to effectively cut either cream or whole corn, at the will of the operator.

To provide a machine which will effectively cut any of the known species of corn such as "Country Gentleman", "Yellow Bantam", "Evergreen" and the like; and which will also effectively cut the corn from relatively short cobs and pieces of cob.

To provide a corn cutting mechanism wherein the cut corn is delivered by gravity, laterally away from the cobs immediately after severance, the cut corn dropping away from the cutting mechanism through a stationary discharge chute and being delivered from the machine in a direction opposite to the direction of normal advancement of the cobs, to thereby avoid interfering with the actuating mechanism of the machine.

To provide improved mechanism for effecting discharge of the cut corn, without undesirably mutilating or degrading the kernels by subjecting the same to the influence of centrifugal force or blower action as in prior machines wherein such force or action is permitted to violently discharge the kernels against adjacent structure.

To provide improved knife structure wherein the cutting edges cooperate with the cobs in advance of the line of tangency, thereby eliminating possible gouging of the cutting edges into the cob such as occurs when the knife edges coact with the cobs at the line of tangency and are movable during adjustment thereof along radii.

To provide a knife assemblage for corn cutters wherein the several blades are only simultaneously rotatable to effect cutting, and simultaneously movable for adjustment, thereby avoiding irregular cutting such as results with relatively rotatable and adjustable knife blades.

To provide a knife structure wherein several knife blades are positively and simultaneously movable to accommodate cobs of different diameters, and wherein resilient restraining means between the several knives are avoided, thus insuring more accurate and uniform cutting.

To provide a machine of the corn cutter type, wherein the knives and their supporting structures are formed to prevent undesirable travel of the cuttings, along the path of travel of the cobs, and whereby juices are prevented from reaching the knife driving and adjusting mechanisms.

To provide improved driving mechanism for the knives of a corn cutter, and improved supporting structure for the driving and knife carrying elements, together with means for permitting convenient removal of the knives from the cutting zone.

To provide a machine wherein the knife edges are surrounded by a supporting ring which is peripherally driven thereby producing an exceedingly short cutting zone and adapting the structure to effectively handle short cobs or nubbins.

To provide improved cob guiding means in advance of the cutters, cooperable with the outermost portions of the kernels to control the setting of the knife edges with respect to the cobs, thereby eliminating undesirable movement of the knives laterally of the cobs and independently thereof.

To provide corn guiding mechanism which will effectively centralize the cobs relative to the axis of rotation of the knives, and wherein the elements cannot move independently of each other, thus insuring proper centering of the cobs at all times.

To provide cob guiding mechanism in advance of the knives, the several elements of which are not movable or yieldable independently of the knives and of the adjacent feed wheels, the knife blades being automatically movable in accordance with the position of the guides in order to insure accurate depth of cutting.

To provide improved cob feeding mechanism comprising only two oppositely disposed feed wheels movable only simultaneously and laterally of the ears passing therebetween, thus producing a compact structure having suitable guide means disposed closely adjacent to the feed wheels.

To provide an improved corn cutter wherein the cobs are fixed against rotation while the knives may be rotated about the advancing cobs at any desired speed, and set to cut at any desired depth in order to remove any desired portion of the kernel.

To provide improved corn cutting mechanism which will effectively cut corn from ears of various diameters, and wherein a shearing cut is produced by proper formation of the knife blades and without introducing a spiral cutting action due to rotation of the ears.

To provide mechanism wherein undesirable mutilation of corn is avoided during feeding of the cobs to the cutters, the cobs being positively advanced only by a minimum number of sharp pointed spur wheels having relatively few spurs, thus avoiding the use of objectionable shoes which bite into the ears and tend to damage the kernels.

To provide improved cob feeding structure wherein two feed wheels are positively and definitely interconnected by a single link of fixed length which produces simultaneous movement of the elements relative to the cob axis, thereby simplifying the structure and eliminating complication resulting from the use of a plurality of rods of adjustable length.

To provide a simple and conveniently adjustable mechanism wherein the use of complicated adjusting mechanism and of an excessive number of springs is avoided, while maintaining flexibility and high efficiency in operation.

To provide a corn cutter structure which is maintained free from accumulation of materials being treated, without the use of scrapers or the like, and all parts of which are conveniently accessible for inspection and cleaning.

To provide a high speed corn cutting machine which is readily operable with minimum power and without danger, and wherein the working parts are protected against damage.

To provide an extremely compact corn cutter having maximum capacity, and a sufficiently wide range of adjustment to suit practically all operating conditions.

To provide improved scraper mechanism for corn cutting machines whereby the residue of the corn remaining after cutting is effectively removed from the cobs.

To provide a machine which will more efficiently remove all of the wholesome portions of the corn from the cobs, without permitting objectionable portions of the cob to enter the edible material.

These and other specific objects and advantages will appear from the following detailed description.

A clear conception of embodiments of the novel features of the improved method of and apparatus for cutting corn from cobs, may be had by referring to the drawings accompanying and forming a part of this specification, in which like reference characters designate the same or similar parts in the various views.

Fig. 4 is still another transverse section through the cutting machine, the section being taken approximately at the plane of the line 4—4 of Fig. 1, looking in the direction of the arrows;

Fig. 5 is another transverse section through the cob scraper mechanism, the section being taken approximately at the plane of the line 5—5 of Fig. 1, looking in the direction of the arrows;

Fig. 6 is a part sectional end elevation of the driving gearing for the corn cutter;

Fig. 7 is a developed section through the driving gearing, the section being taken along the irregular line 7—7 of Fig. 6;

Fig. 8 is a fragmentary top view of the corn cutting mechanism of the machine;

Fig. 9 is a section through a fragment of the knife adjusting mechanism;

Fig. 10 is a somewhat diagrammatic view showing the action of the cutters under certain operating conditions;

Fig. 11 is a similar diagrammatic view showing the action of the cutters under other operating conditions;

Fig. 12 is a fragmentary section showing a modified form of feed and guide mechanism;

Fig. 13 is an end view of one of the modified feed wheels;

Fig. 14 is a fragmentary rear view of the improved cutting mechanism looking along the axis of the machine in a direction opposite to that of advancement of the ears; and Fig. 15 is an enlarged longitudinal central vertical section through the cutting zone of the machine and through the adjacent guide mechanism.

Figure 1:
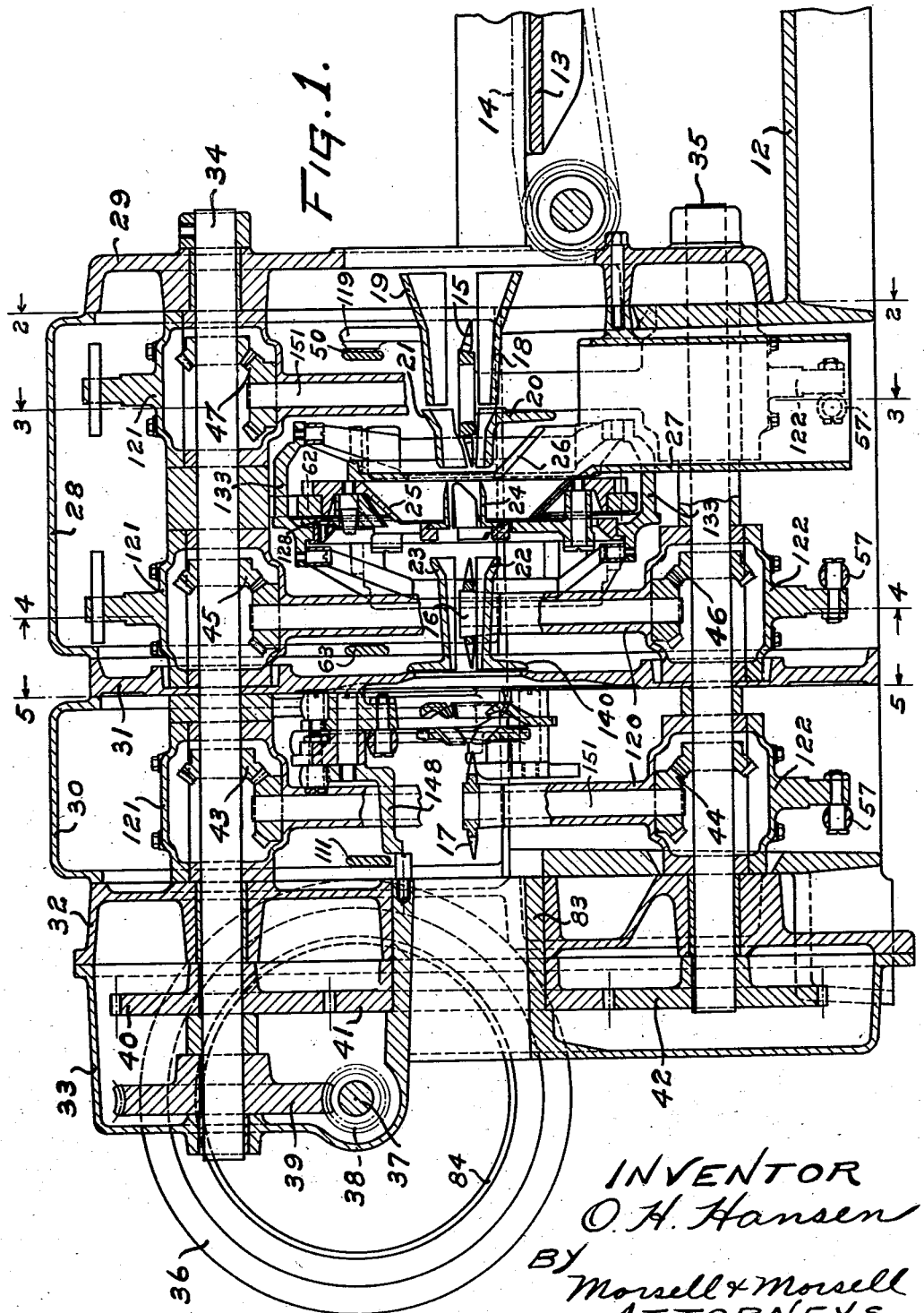
Fig. 1 is a longitudinal section through a fragment of the corn cutter, showing the corn guiding, feeding, cutting, and cob scraping mechanisms.

In order to avoid confusion in terms, the combined corn and its supporting cob will hereinafter be designated as the "ears"; the seed particles will be termed the "kernels"; and the supporting core will be referred to as the "cob"; thus making the ears equal to the cob plus the kernels. While various relatively restricted terms will be employed herein for the sake of clearness, it is not intended to thereby restrict the scope of this invention, and the claims should therefore be given the broadest possible interpretation consistent with the novelty involved.

Referring to the drawings, the improved corn kernel cutter comprises in general, mechanism for introducing the successive ears into the machine; mechanism for guiding and feeding the ears and the cobs through the machine; kernel cutting mechanism including means for properly positioning the cutting knives; cob scraping mechanism including means for properly positioning the scrapers; driving mechanism for actuating the ear and cob feeding and the kernel cutting mechanism; and suitable structure for supporting and housing the various elements of the machine.

The mechanism for introducing the ears of corn in succession to the cutting machine, comprises an endless conveyor 14 of usual construction mounted upon the main frame 12 and having an upper run coacting with a stationary guide 13 to advance the successive ears with their smaller ends foremost, axially toward the cutters. The longitudinal axes of the successive ears as they advance toward the cutters, may either be parallel to or coincide with the central horizontal axis of the machine, depending upon the diameters of the ears, see Fig. 1.

The mechanism for guiding and feeding the ears to the cutting mechanism, comprises a set of lower and upper relatively movable guides 18, 19 having their receiving ends located closely adjacent to the delivery end of the conveyor 14, and a set of spur wheels 15 rotatable about substantially vertical axes disposed on opposite sides of the longitudinal guide axis, the spur wheels 15 being relatively movable toward and away from the guide axis in the spaces which separate the guides 18, 19 vertically. The spurs of the rotary feed wheels 15 project inwardly beyond the guiding surfaces of the guides 18, 19, and these guiding surfaces are preferably tapered as shown in order to facilitate entry of the approaching and advancing ears to the guides, see Figs. 1 and 2.

The ear guides 18, 19 are swingably supported upon horizontal pivot shafts 52, 53 respectively, which are mounted upon the main frame 12, and are provided with integral upwardly extending arms 118, 119 respectively, which are pivotally connected to the opposite ends of a single straight link 50 of fixed length, thus compelling the guides 18, 19 to swing in unison toward and away from the central guiding axis. The single link 50 is preferably located above the guides 18, 19 in order to avoid accumulation thereon of debris which might drop from the advancing ears, and also in order to eliminate obstruction to the delivery of cut kernels from the machine. The upper guide 19 is moreover provided with an integral adjusting arm 51 depending from its pivotal axis, and an adjusting rod 54 has its inner end pivotally connected to the lower end of the arm 51. The rod 54 is guided to slide horizontally in the frame 12, and has its outer screw threaded end provided with an adjusting nut 56. A coil spring 55 embracing the medial portion of the rod 54, coacts with the adjusting nut 56 and with the adjacent portion of the frame 12, to constantly urge the guides 18, 19 toward each other, and the effectiveness of the spring 55 may obviously be conveniently varied from the exterior of the machine by manipulation of the nut 56. With this arrangement of the guide elements, the advancing ears will automatically separate the guides 18, 19 in accordance with the ear diameters, but the ears will always be properly centralized and snugly engaged by the guiding surfaces, regardless of variations in the ear diameters.

The supports 120 for the ear feed wheels 15 are swingably mounted upon upper and lower parallel feed wheel drive shafts 34, 35, the axes of which are off-set slightly from the central vertical plane of the machine in order to eliminate undesirable obstruction to the delivery of cut kernels. The two feed wheels 15 are rapidly rotatable about their own axes by means of bevel gear sets 47, 48 coacting with the rotary drive shafts 34, 35 respectively, and the feed wheel supports 120 are provided with removable caps 121, 122 which permit convenient access to the gear sets 47, 48. The caps 121, 122 are moreover provided with integral laterally extending arms which are pivotally connected to the upper and lower ends of a single link 49 curved as shown, in order to insure clearing the adjacent spur wheel 15. The upper cap 121 may be additionally provided with a transverse grip rod 123 for permitting manual swinging of the feed wheels 15 about their pivotal supports, and the lower cap 122 has an integral depending arm the lower swinging end of which is pivotally attached to the inner end of an adjusting rod 57. The rod 57 is guided to slide longitudinally in the frame 12, and has an outer screw threaded end provided with an adjusting nut 59 manipulable from the exterior of the machine. A coil spring 58 embraces the threaded end portion of the rod 57 and is compressed between the nut 59 and the adjacent portion of the frame 12 so as to constantly urge the spur wheels 15 toward each other, and the degree of compression of the spring 58 may be varied by adjusting the nut 59. With this assemblage of feed elements, the successive ears of corn are automatically drawn past the guides 18, 19 and positively urged toward the cutters, by the positively driven spur wheels 15, which are resiliently moved toward the central axis by the spring 58 and are separated from each other by the enlarging diameters of the ears. The spurs of the wheels 15 are relatively sharp and few in number, and the passing cobs are engaged by only two of the wheels 15 thus avoiding undesirable mutilation of the kernels. It should also be noted that the swinging movement of the feed wheels 15 in no manner interferes with the feeding rotation of these wheels, by virtue of the fact that the drive shafts 34, 35 also serve as pivot shafts.

The improved kernel cutting mechanism consists of a set of rapidly revolving knife blades 24, upper and lower gages 21, 20 located in advance of the knives, means for imparting adjusting motion from the gages to the knife blades, and mechanism for revolving the knives about the central axis of the machine, see Figs. 1, 3, 4, 8, 9, 10 and 11. Although the knife blades 24 are revolvable as well as being movable toward and away from the central axis or the axis of revolution, the gages 21, 20 are movable only toward and away from this axis and are not revolvable.

The depth gages 20, 21 are swingably supported upon the horizontal pivot shafts 52, 53 which likewise support the guides 18, 19, and are provided with integral upwardly projecting arms 124, 125 respectively, which are pivotally connected to the adjacent ends of a second straight link 63, thus causing the gages 20, 21 to move in unison toward and away from the central horizontal axis. As in the case of the guide link 50, the gage link 63 is preferably disposed above the gages 20, 21 in order to avoid accumulation of debris thereon, and also in order to avoid interference with delivery of cut kernels from the machine. The upper gage 21 is furthermore provided with an integral adjusting arm 64 depending from the pivotal axis of the gage, and an adjusting rod 65 slidably associated with the frame 12 has its inner end pivotally attached to the lower end of the arm 64. A nut 67 is adjustably attached to the outer threaded end of the rod 65, and a compression spring 66 embraces the threaded portion of the rod 65 and reacts against the nut 67 and against the adjacent outer portion of the frame 12. As in the case of the guides 18, 19, the advancing ears of corn passing between the gages 20, 21 will automatically spread the gages in accordance with the enlarging external diameters of the ears, but the spring 66 will always maintain the gages 20, 21 in snug engagement with the kernels. It will also be apparent from Figs. 1, 10 and 11, that the gages 20, 21 and the feed wheels 15 are located as close as possible to the zone of action of the cutting knives or blades 24, thus not only permitting very accurate adjustment of the knives, but also enabling the machine to cut kernels from broken ears or nubbins.

The knife blades 24 are revolvable within a simultaneously revolving supporting member 25 having an inclined wall surrounding and spaced from the forwardly extending blades 24 to form a cutting chamber which is entirely free from obstruction against free gravitation of the cut kernels. The chamber formed by the annular knife supporting member 25, is in open communication at its lower forward portion, with a stationary discharge chute 27, and a wall 26 serves to direct the kernels into the chute and prevents the bouncing particles from reaching the gage and feeding mechanisms. The chute 27 thus receives all of the removed kernels delivered by gravity from the cutting zone, and it will be noted that by locating this chute at the inlet side of the cutting chamber and thus causing the kernels to be discharged in a direction opposite to that of the advancing ears and cobs, a very compact structure results and mutilation of the cut kernels during discharge thereof is entirely eliminated.

Figure 2:
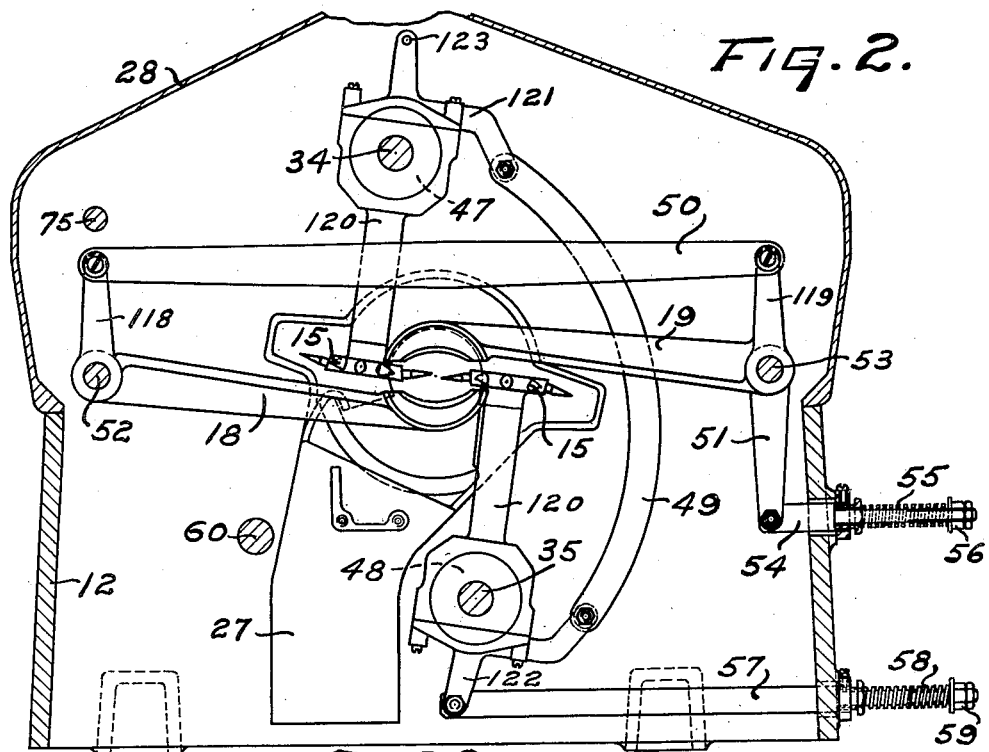
Fig. 2 is a transverse section through the corn cutter, the section being taken approximately at the plane of the line 2—2 of Fig. 1, looking in the direction of the arrows.

Each of the four knife blades 24 is swingably supported upon the revolving member 25 by means of a screw 97 coacting with a knife bracket 96 as shown in Figs. 1 and 4, and the brackets 96 are swingable so as to move the cutting edges of the blades 24 along arcs which are somewhat in advance of the adjacent radii of tangency. This construction causes the cutting edges to shear the kernels off of the cobs ahead of the points of tangency and thereby eliminates possible gouging of the knives into the cobs. The swingable knife supporting brackets 96 are obviously revolvable with the member 25, and each of the brackets is provided with one or more grooves or recesses 98 all of which converge toward a common point located approximately upon the central horizontal axis of the machine beyond the zone of cutting. The supporting member 25 is moreover provided with four parallel guide studs 126 upon which adjusting blocks 127 are loosely slidably mounted, and each of the blocks 127 has one or more inclined teeth 99 coacting with the adjacent recesses 98 of the corresponding bracket 96. The blocks 127 are revolvably supported by means of a tapered ring which is rotatably mounted in a central bore of a shifting ring 95, and the blocks 127 have end projections engaging an annular groove 128 formed in the shifting ring 95, so that the ring 129 and the blocks 127 may revolve freely with the knife supporting member 25 and be slid back and forth on the studs 126, without necessitating rotation of the shifting ring 95 which has sidewise translatory movement only. With this assemblage of elements, the four blades 24 are obviously fixed in any position relative to the cutting axis, corresponding to a definite position of the shifting ring 95 along this axis, and when the ring 95 is shifted laterally, all of the blades 24 are simultaneously moved toward or away from the cutter axis by the coacting teeth 99 and recesses 98, regardless of whether the knives are revolving or not.

The knife supporting frame 74 is suspended from the upper drive shaft 34 about which the entire knife assembly may be swung to remove the same from the machine for inspection purposes. The frame 74 may be held in operative position by means of a latch element 73 supported upon the pivot shaft 53 and having a hub with which a stop arm 131 may coact, the stop arm 131 being formed integral with the frame 74. A socketed arm 132 formed integral with the periphery of the frame 74 opposite to the arm 131, is adapted to engage a stop pin 77 secured to the partition 31, and thus cooperates with the arm 131 to hold the knife supporting frame 74 in operative position. The latch element 73 may be swung about the pivot shaft 53 in order to release the stop arm 131 when the frame 74 is being moved out of the cutting zone about the shaft 34, and may subsequently be swung back into the position shown in Fig. 4 in order to act as a stop cooperable with an integral stop lug 76 of the frame 74 to hold the knife supporting frame 74 in removed position. This pivotal mounting of the knife assembly, permits the same to be freely withdrawn from operative position, at any time, the knife driving connection being automatically interrupted during the removal operation as will be hereinafter described.

The shifting ring 95 is pivotally associated at diametrically opposite portions thereof, with the outer ends of the arms of a U-shaped shifting bracket 94, and the arm connecting portion of this bracket 94 is swingably supported upon integral side lugs of the knife supporting frame 74, by means of concentric pivot pins 130 which are parallel to the pivots at the outer arm ends, see Figs. 1, 4, 8 and 9. The ring 95 is also provided with upper and lower laterally projecting lugs 133 the upper of which extends through an opening 134 in the frame 74 and the lower of which extends beneath the frame 74, to the opposite side of this frame. A second U-shaped shifting bracket 72 has the outer ends of its arms pivotally connected to the ends of the lugs 133, and the arm connecting portion of this second bracket 72 is swingably supported upon integral side lugs of the knife supporting frame 74 at the side thereof opposite to the bracket 94, by means of coaxial pivot pins 135. The pivot pins 135 are parallel to the pivot pins 130, and to the pivots at the outer ends of the arms of the brackets 72, 94, and the plane containing the axes of all of these pivots associated with the bracket 72, is at all times parallel to the plane containing the axes of all of said pivots associated with the bracket 94, as clearly indicated in Figs. 8 and 9. The formation and mounting of the brackets 72, 94 is therefore such, that the shifting ring 95 will always be disposed in a plane perpendicular to the central horizontal axis of the machine, and the slight lateral movement of the ring 95 due to the swinging of the brackets 94, 72 about the fixed pivot pins 130, 135 is compensated for by the loose fit between the holes in the blocks 127 and the studs 126 upon which these blocks are slidable.

Figure 3:
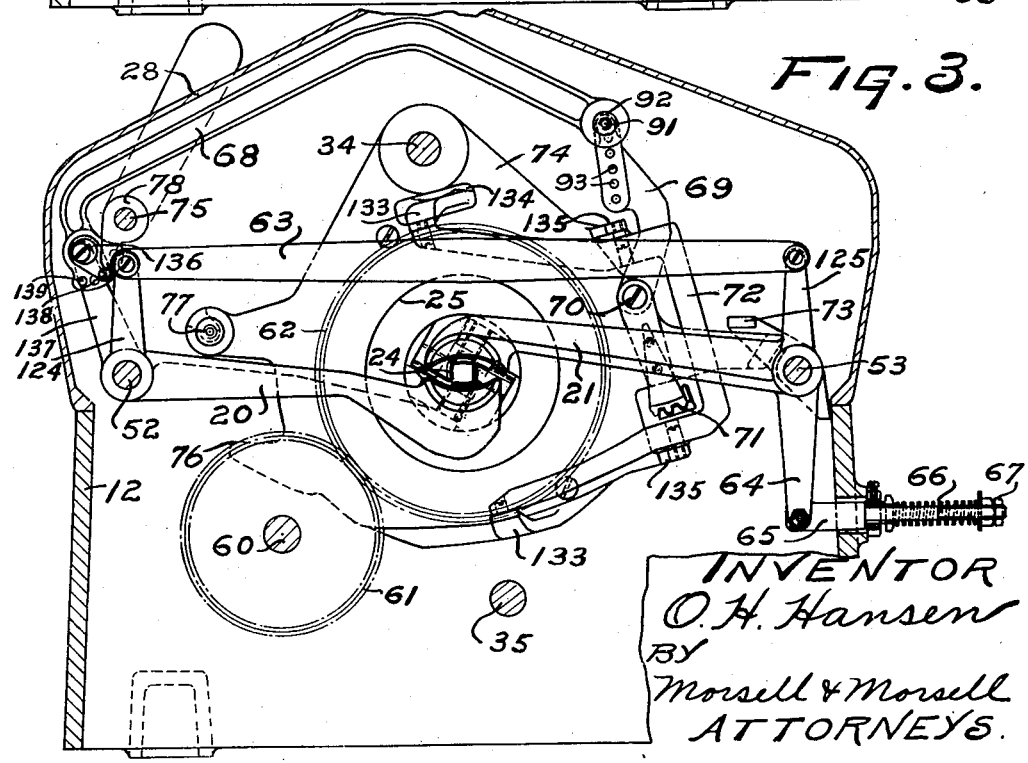
Fig. 3 is another transverse section through the cutter mechanism, the section being taken approximately at the plane of the line 3—3 of Fig. 1, looking in the direction of the arrows.

The shifting ring supporting bracket 94 is additionally provided with an integral laterally projecting arm 71 having a set of bevel gear teeth secured to the swinging ends thereof as shown in Fig. 3, and these teeth mesh with a set of similar teeth secured to the lower arm of a knife adjusting lever 69 which is pivotally supported at its medial portion upon a horizontal pivot pin 70 secured to the frame 74. The upper arm of the lever 69 is provided with a series of holes 93 to any one of which a pivot pin 91 may be applied so as to vary the effective length of the upper arm of the lever 69. One end of a bent link 68 is detachably pivotally associable with the pin 91 by virtue of a thumb nut 92, and the opposite end of the link 68 is pivotally associated with an eccentric 136 which is adjustably supported in a bore formed in the upper swingable end of an arm 137. The arm 137 is pivotally supported upon the pivot shaft 52, and is swingable in unison with the lower gage 20 and with the gage arm 124, and the eccentric 136 may be locked in various positions of adjustment by means of a pin 138 coacting with any one of a series of holes 139 formed in an integral flange of the link 68, as shown in Figs. 3 and 4. An abutment 78 pivotally associated with the horizontal rod 75, is movable by means of a lever from the exterior of the casing or cap 28, to spread the gages 20, 21 and the cutting knives 24, independently of the ears passing therebetween, and the spring 66 functions to return the gages and knives upon release of the lever. From the foregoing description of the linkage connecting the gages 20, 21 with the knife supporting brackets 96, it will be apparent that as the gages 20, 21 move inwardly and outwardly relative to the axis of revolution of the knives, motion is transmitted through the arm 137, bent link 68, lever 69, brackets 72, 94, shifting ring 95, tapered revolving ring 129, and revolving blocks 127, to the knife brackets 96, thus causing the blades 24 to simultaneously move in unison with the gages 20, 21. The adjustable eccentric 136 and the adjustable connection between the link 68 and the lever 69, however, permit variation in the relative movements of the gages 20, 21 and the blades 24, in order to meet certain conditions of operation to be hereinafter described.

The mechanism for guiding and feeding the cobs from the cutting mechanism to the scraping mechanism, is somewhat similar to that for guiding and feeding the ears to the cutters, being shown in detail in Fig. 1. This cob guiding and feeding mechanism comprises, a set of lower and upper relatively movable guides 22, 23 having their cob receiving ends located in close proximity to the cutter blades 24, and having their discharge ends disposed closely adjacent to the scrapers; and a set of horizontally spaced spur wheels 16 rotatable about substantially vertical axes positioned on opposite sides of the central horizontal machine axis, the wheels 16 being likewise movable toward and away from said latter axis in the space separating the guides 22, 23. The spurs of the feed wheels 16 project inwardly beyond the tapered guiding surfaces of the guides 22, 23, and the guides are provided with flanges 140 having plane surfaces cooperable with an adjoining surface of the intermediate partition and support 31 to segregate the cutting zone from the scraping zone.

The cob guides 22, 23 are also swingably supported upon the horizontal pivot shafts 52, 53 which support the ear guides 18, 19, and are likewise interconnected by means of a single straight link 50 located above the guides, in order to cause the cob guides to swing in unison toward and away from the central machine axis. These cob guides 22, 23 are furthermore provided with a single spring 55 the tension of which is adjustable from the exterior of the machine, for constantly urging the guides toward the central machine axis and for thus maintaining the guide 22, 23 in snug engagement with the successive cobs passing therebetween irrespective of variations in the diameters of these cobs.

The cob feed wheels 16 are also swingably mounted upon the upper and lower feed wheel drive shafts 34, 35 as in the case of the ear feed wheels 15. The feed wheels 16 are likewise rapidly rotatable in opposite directions by means of bevel gear sets 45, 46, coacting with the rotary drive shafts 34, 35 respectively, and the supports 120 of the feed wheels 16 are again provided with detachable caps 121, 122 for permitting access to the gear sets 45, 46. The mechanism for simultaneously urging the cob feed wheels 16 toward each other and for adjusting the tension of the urging spring of these wheels, is identical with that described in connection with the ear feed wheels 15, and the swinging motion of the feed wheels 16 likewise does not interfere with other elements of the machine.

The improved cob scraping mechanism shown in detail in Figs. 1 and 5, consists of two sets of scraper blades, each set comprising three simultaneously movable cooperating blades. The two sets of scraper blades are mounted laterally adjacent to each other, upon pivot pins 112, 141, 142 secured to a U-shaped bracket 100 which is swingably suspended from the shaft 34. This suspension bracket 100 is normally held in fixed position by means of a retaining pin 117 and a clamping nut associated with said pin, but may be swung upwardly about the shaft 34 upon removal of the closure cover 30, so as to permit ready inspection of the scrapers.

The blades 101, 102 of the first set, are swingably supported upon the pivot pins 141, 142 respectively, and the blade 103 of this set is likewise pivotally supported upon the pin 112. A link 105 connects the blade 102 of the first set, with an integral arm 143 of the blade 103, and a second link 104 likewise connects the blade 101 with the blade 103. The blade 103 is moreover provided with an integral crank 144 having a crank pin which is pivotally associated with an end of a connection 109, the opposite end of which is detachably pivotally attached to the upper end of an adjusting arm 113 swingably mounted upon the pivot shaft 53. The lower end of the arm 113 is connected to a slide 114 which is provided with a threaded extension embraced by a spring 115 and carrying adjusting nuts 116 for varying the tension of the spring 115. The spring 115 tends to urge the scraper blades 101, 102, 103 toward the central horizontal axis of the machine, at all times, but permits the cobs to separate the scrapers during advancement of the successive cobs through the machine.

The blades 106, 107 of the second set of scrapers, are likewise swingably supported upon the pivot pins 141, 142 respectively, and the blade 108 of this set is also pivotally supported upon the pin 112. Another link 105 connects the blade 107 of the second set, with the blade 108 of that set, and a second link 104 likewise connects the blade 106 with the blade 108. The blade 108 of the second set is provided with an integral crank 145 having a crank pin which is pivotally associated with an end of a second connection 110 the opposite end of which is pivotally but detachably attached to a second arm 113 swingably mounted upon the pivot shaft 53. The second arm 113 is associated with a slide 114 and with a spring 115 as in the case of the first set of scrapers, and the scraper blades of the two sets are therefore independently adjustable and movable relative to the horizontal machine axis.

The two adjacent arms 113 are, however, provided with cooperating lugs 149 which are adapted to engage each other during normal operation of the scrapers, so as to cause all of the blades 101, 102, 103, 106, 107, 108 to move in and out relative to the main axis, substantially in unison, while permitting the blades of each set to move within limits, independently of those of the other set. A horizontal cross link 111 disposed laterally adjacent to the bracket 100, has one end pivotally connected to an arm 147 formed integral with the second arm 113 and has its opposite end pivotally supported by an arm 146 mounted on the pivot shaft 52. An abutment 88 pivotally associated with the horizontal rod 75, is movable to spread the scraper blades against the action of the spring 115, and this spring returns the blades to normal upon release of the abutment 88. The forward component of the pressure created during the scraping operation, is resisted by a pin secured to a sleeve 83 and coacting with a projection 148 formed integral with the bracket 100, as shown in Fig. 1.

The final cob discharge wheels 17 are disposed closely adjacent to the discharge sides of the scrapers and are likewise swingably mounted upon the upper and lower feed drive shafts 34, 35 as in the case of the cob feed wheels 16 and of the ear feed wheels 15. The discharge wheels 17 are also rapidly rotatable in opposite directions by means of bevel gear sets 43, 44 coacting with the rotary drive shafts 34, 35 respectively, and the supports 120 of the spur wheels 17 are again provided with detachable caps 121, 122 for permitting ready access to the gear sets 43, 44. The mechanism for simultaneously swinging the discharge wheels 17 toward each other and for adjusting the tension of the urging springs of these wheels, is also the same as that applied to the cob and ear feed wheels 15, 16.

As illustrated in Figs. 12 and 13, the spur wheels 150 for transporting the corn ears through the machine may be modified by the provision of a guide closely adjacent to the effective zone of the spurs thereof. These spur wheels 150 are removably attached to the ends of the drive shafts 151 which are rotatably supported in the swinging brackets or supports 120, by means of screws 154 coacting with driving heads secured to the shaft ends. Brackets 152 secured to the adjacent ends of the supports 120, carry guide shoes 153 adapted to engage the ear peripheries and having slots through which the spurs of the wheels 150 are adapted to travel. These guiding shoes 153 are movable toward and away from the axis of advancement of the ears and cobs, simultaneously with the spur wheels 150, and always maintain the spurs in proper coaction with the ears. The guides or shoes 153 moreover cooperate with the adjacent upper and lower guides 190, 180, to maintain the ear axes in line with the horizontal axis of the machine, thereby insuring accurate guiding of the ears and cobs to and from the knives and scrapers.

The improved driving mechanism for actuating the ear and cob feeding and the kernel cutting and cob scraping mechanism, comprises in general driving and idler pulleys 84, 85 associated with a transverse power shaft 37, and gearing for transmitting motion from the shaft 37 to the various power actuated elements of the machine. The power shaft 37 may be actuated by hand by means of a hand wheel 36 secured to the outer end thereof, and may be connected to or disconnected from the source of power supply, by means of a belt shifter 86 which is operable by a control lever 87, see Figs. 1, 6 and 7. A worm 38 secured to the inner end of the power shaft 37 meshes with a worm wheel 39 which is keyed to the upper drive shaft 34 thus causing the shaft 34 to rotate when the power shaft 37 is rotated, but at reduced speed. A spur gear 40 which is keyed to and is therefore rotatable by the upper drive shaft 34, meshes with a central spur gear 41 rotatably supported upon a bearing sleeve 83 formed integral with a gear enclosing cap 33 detachably associated with an end casing 32. The end casing 32 is rigidly attached to the main frame 12 and the bearing sleeve 83 provides a support for the stop pin which coacts with the projection 148 of the scraper frame, and is formed hollow to permit unobstructed delivery of the cobs 90 therethrough. The central spur gear 41 meshes with and is adapted to drive another spur gear 42 which is keyed to the lower drive shaft 35, and since the gears 40, 42 are of like diameter and the central gear 41 is merely an idler, the gears 150

40, 42 and hence the shafts 34, 35 will be rotated at the same speed but in opposite directions. This opposite rotation of the drive shafts 34, 35 is necessary in order to produce opposite rotation of the feed or spur wheels located on opposite sides of the axis of travel of the ears and cobs, the spur wheels 15, 16, 17 and 150 being rotatable at relatively slow speed directly by the shafts 151 which are driven from the shafts 34, 35 through the bevel gearing 43, 44, 45, 46, 47, 48.

The lower spur wheel 42 also meshes with a pinion 80 rotatably supported upon a counter shaft 79 mounted in bearings in the end casing 32 and cap 33 and another spur gear 81 mounted upon the same counter shaft 79 is adapted to be driven directly by the pinion 80, see Figs. 6 and 7. The large spur gear 81 in turn meshes with a pinion 82 secured to the end of the knife driving shaft 60 which because of the relative sizes of the gears 42, 81 and pinions 80, 82 is obviously rotated at much higher speed than the shafts 34, 35. The knife driving shaft 60 is supported in suitable bearings in the frames 12, 32, 33 and has a spur gear 61 secured thereto which meshes with a gear 62 attached directly to the knife carrier member 25, see Figs. 1, 3 and 4. The knives or blades 24 are therefore revolved about the central axis of the machine at relatively high speed, and the power actuated mechanism which is located within the cutting and scraping zones, is normally enclosed by means of the end frames 29, 31, 32 and by the detachable covers 28, 30, 33 all of which are associated with the main frame 12.

During normal operation of the improved corn cutter, the various guides and gages and the knives, should first be adjusted to produce the class of product desired, it being remembered that the machine is adapted to cut either the entire kernels 89 from the cobs 90, or only a desired portion thereof. After the lever 87 has been shifted to apply the power, the ears of corn are fed in succession by the conveyor 14 and spur wheels 15, 16, 17, past the centering guides 19, gages 20, 21, knives 24, centering guides 22, 23, and scrapers 101, 102, 103, 106, 107, 108, the bare cobs 90 being eventually discharged from the machine through the sleeve 83. The non-rotary floating gages 20, 21 by virtue of their interconnection with the revolving knives or blades 24, cause the latter to shear the kernels 89 or a part thereof, from the advancing cobs 90 as indicated in Figs. 10 and 11, whereupon the removed corn drops by gravity into the fixed discharge chute 27 and is delivered from the machine. The scrapers eventually remove the remainder of the corn from the cobs 90 and this remainder is likewise delivered from the machine by gravity through a suitable discharge chute.

Since it is desirable to produce various classes of final product, and to remove corn from ears having variable characteristics, the mechanism for relatively adjusting the non-rotary gages 20, 21 and the rotating knives or blades 24, is of extreme importance. As clearly shown in Figs. 10 and 11, the taper of the cut may be quickly and accurately varied throughout a considerable range, by merely changing the position of the adjusting pin 91 relative to the holes 93 of the lever 69, thereby permitting accurate cutting of any type of corn regardless of the taper of the ears and of the cobs. The depth of cutting may also be conveniently and accurately adjusted by merely adjusting the eccentric 136 and by subsequently locking the eccentric 136 in the desired position of adjustment with the aid of the locking pin 138 cooperating with the holes 139 of the bent link 68. Adjustment of this eccentric 136 causes the blades 24 to move relative to the gages 20, 21 with respect to the central horizontal axis of the machine, thereby permitting rapid adjustment for depth of cut as well as for taper of the cut.

The various internal mechanisms of the machine are moreover freely accessible for inspection or removal upon release of the detachable covers 28, 30, 33. When the front cover 28 is removed, the entire knife supporting and driving mechanism may be readily swung clear of the surrounding structure, about the upper shaft 34, the driving connection between the driving and driven gears 61, 62 being automatically interrupted during such swinging movement. The knives or blades 24 are then conveniently accessible for inspection, sharpening or renewal; and the entire scraper mechanism may be likewise withdrawn from the surrounding structure upon removal of the cover 30, by swinging the scraper supporting bracket 100 about the upper shaft 34, see Figs. 4 and 5. By virtue of this free removal and accessibility of the cutting and scraping mechanisms, the machine may obviously be readily maintained in sanitary and efficiently operative condition.

From the foregoing description, it will be apparent that the improved structure is capable of effectively exploiting the improved process claimed herein, and this has been proven beyond doubt by the commercial success which has been attained with the aid of this invention. The machine will effectively cut either cream or whole corn of any known species, regardless of whether the ears are long or short. The removed product is delivered from the machine by gravity, thereby avoiding the unsanitary conditions resulting from the use of centrifugal force as a discharge medium. The product is not undesirably mutilated as with the prior corn cutters, and all of the delicate parts of the mechanism are amply protected against possible damage. The formation of and the adjustments provided for the various gaging, cutting and scraping mechanisms, not only insure accurate cutting and complete removal of the edible corn, but also prevent delivery of unwholesome particles such as pieces of cob, with the kernels and milk. The machine besides effectively removing the corn from the cobs, has enormous capacity considering the space occupied, and is moreover of compact and durable construction. The capacity of the machine is furthermore enhanced by virtue of the disposition of the motion transmission linkage above the horizontal plane of cutting, and this specific disposition of the linkage, also enhances the sanitary condition of the machine by avoiding possible accumulation of material thereon. The convenient removability of parts also permits the operator to maintain such parts in highly sanitary condition, and when the knife support is in normal operating position, the driving gear 61 coacting with the gear 62 of the support, tends to retain the knife support in normal operating position without the aid of other fastening means.

It should be understood that it is not desired to limit the invention to the exact details of construction of the machine and to the precise steps of the process, herein shown and described, for various modifications within the scope of the claims may occur to persons skilled in the art.

It is claimed and desired to secure by Letters Patent:

1. In combination, a knife extending longitudinally of and revolvable about an axis, a rotary support for said knife having a tapered surface surrounding said axis and the zone of action of said knife, the length of said surface measured along said axis being substantially equal to the corresponding knife length, means for advancing successive ears of corn through said zone and toward said knife along said axis, and means for simultaneously revolving said knife and said surface, said knife being suspended from said support at the discharge end of said zone and said surface being tapered to deliver all of the cut kernels from said zone away from and along said axis in a direction opposite to the direction of advancement of the ears.

2. In combination, a knife extending longitudinally of and revolvable about an axis, a rotary support for said knife having an annular tapered surface surrounding said axis and the zone of action of said knife, the length of said surface measured along said axis being substantially equal to the corresponding knife length, feed means for advancing successive ears of corn centrally through said zone and toward said knife along said axis, and means for rotating said support to simultaneously revolve said knife and said surface, said surface being tapered to deliver all of the cut kernels from said zone away from and along said axis in a direction opposite to the direction of advancement of the ears.

3. In combination, a knife revolvable about a fixed axis, means for feeding successive ears of corn along said axis and toward said knife, a cut-depth-gage cooperable with the outermost portions of the kernels on the ears in advance of said knife and near said feeding means, said gage being movable laterally of said axis and being held against rotation relative thereto, and motion transmitting mechanism for transferring said lateral gage motion to said knife to cause corresponding motion of the latter laterally of said axis.

4. In combination, a knife revolvable about a fixed axis, means for feeding successive ears of corn along said axis and toward said knife and for preventing rotation of said ears during advancement thereof, a cut-depth-gage cooperable with the outermost portions of the kernels on the ears between said feeding means and said knife, said gage being movable toward and away from said axis and being held against rotation relative thereto, motion transmitting mechanism for transferring said gage motion to said knife while revolving to cause corresponding movement of the latter toward and away from said axis, and resilient means coacting with said mechanism to constantly urge said knife and said gage toward said axis.

5. In combination, a knife revolvable about a fixed axis, means for feeding ears of corn in succession along said axis and toward said knife while preventing rotation of the ears during longitudinal advancement thereof, a cut-depth-gage cooperable with the kernels on the ears in advance of said knife, said gage being movable toward and away from said axis and being held against rotation relative thereto, motion transmitting mechanism including relatively rotating coacting elements for transferring said gage motion to said knife to cause corresponding movement of the latter while revolving, and resilient means coacting with said mechanism between said elements and said gage for urging said knife and said gage toward said axis.

6. In combination, a knife revolvable about a fixed axis, means for feeding ears of corn along said axis and toward said knife, a cut-depth-gage cooperable with the ears in advance of said knife, said gage being held against rotation about said axis and being movable toward and away from the same, motion transmitting mechanism including coacting elements which are relatively movable along said axis for transferring said gage motion to said knife to cause corresponding movement of the latter while revolving, and resilient means coacting with said mechanism between said elements and said gage for urging said knife and said gage toward said axis.

7. In combination, a knife revolvable about a fixed axis, means for feeding ears of corn along said axis and toward said knife, a rotary support for said knife, driving mechanism coacting with said support, and a pivotally supported frame in which said support is rotatably mounted, said frame being swingable about its supporting pivot to simultaneously release said support from driving coaction with said mechanism and to move said knife away from the path of travel of the ears.

8. In combination, a knife extending along and revolvable about a horizontal axis, means supporting said knife for movement toward and away from said axis, means for feeding ears of corn along said axis, gages cooperable with the ears in advance of said knife near said feeding means, said gages being movable toward and away from said axis and being fixed against rotation thereabout, motion transmitting mechanism for transferring the gage motion to said knife, and linkage interconnecting said gages to impart simultaneous movement thereto, said linkage being disposed entirely above said axis at the path of travel of the ears.

9. In combination, a knife extending along and revolvable about a horizontal axis, means supporting said knife for movement toward and away from said axis, means for feeding corn ears and cobs along said axis toward and away from said knife, a set of guides on each side of said knife near said feeding means, a set of gages cooperable with the ears in advance of the knife and following the feed guides, each of said sets being movable toward and away from said axis and being fixed against rotation thereabout, motion transmitting mechanism for transferring the gage motion to said knife, and linkage interconnecting each of said sets to impart simultaneous movement thereto, said linkage being disposed entirely above said axis at the path of travel of the ears and cobs.

10. In combination, a knife revolvable about an axis, means for feeding ears of corn toward said knife along said axis, an element movable along said axis to move said knife transversely thereof, said element being fixed against rotation about said axis, resilient means coacting with said element to urge said knife toward said axis, and means for varying the tension of said resilient means while said knife is revolving.

11. In combination, a knife revolvable about an axis, means for feeding ears of corn toward said knife along said axis, a gage cooperable with the ears in advance of said knife, an element movable by said gage along said axis to move said knife transversely thereof, said gage and said element being fixed against rotation about said axis, and adjustable resilient means coacting with said gage and with said element to urge said knife and said gage toward said axis.

12. In combination, a knife revolvable about an axis, means for feeding ears of corn toward said knife, a gage fixed against rotation about said axis for positioning said knife relative to the advancing ears, and motion transmitting mechanism connecting said gage and said knife, said mechanism including means for independently varying the depth and the taper of the cut effected by said knife upon the ears.

13. In combination, a knife revolvable about an axis, means for feeding ears of corn toward said knife, a gage coacting with the peripheries of the advancing ears in advance of said knife fixed against rotation about said axis for positioning the latter relative to said axis, and motion transmitting mechanism connecting said gage and said knife, said mechanism including means for varying the depth of the cut and independently adjustable means for varying the taper of the cut relative to the taper of the cob periphery.

14. In combination, a knife revolvable about an axis, means for feeding ears of corn toward said knife, an element movable along said axis, said element being fixed against rotation about said axis, and motion transmitting mechanism between said element and said knife for converting the movement of said element along said axis into movement of said knife transversely of said axis, said mechanism comprising intermeshing spiral gear teeth movable about parallel axes.

15. In combination, a knife revolvable about an axis, means for feeding ears of corn toward said knife, an element fixed against rotation about said axis and movable therealong, a rotary support for said knife coacting with said element to guide the same, said knife being pivotally mounted upon said support, and a motion transmitting connection between said element and said knife comprising coacting tapered surfaces for converting the movement of said element along said axis into simultaneous motion of said knife transversely of said axis.

16. In combination, a knife revolvable about an axis, feed wheels on opposite sides of said axis for urging ears of corn toward said knife, gages on opposite sides of said axis between said feed wheels, said gages and said wheels being fixed against displacement about said axis, and motion transmitting mechanism for transferring motion of said gages transversely of said axis to said knife while revolving to produce movement of the latter in similar directions.

17. In combination, a knife revolvable about an axis, feed wheels on opposite sides of said axis in advance of said knives for urging ears of corn along said axis, guides cooperable with the ears between said feed wheels, gages cooperable with the ears between said knife and said guides, said feed wheels and said guides and said gages being fixed against rotation about said axis and being independently movable transversely said axis, and means for converting the movement of said gages into corresponding motion of said knife.

OSWALD H. HANSEN.